US007475350B2

(12) United States Patent
Boyles et al.

(10) Patent No.: US 7,475,350 B2
(45) Date of Patent: Jan. 6, 2009

(54) METHOD AND SYSTEM TO LAYOUT TOPOLOGY OBJECTS

(75) Inventors: Ryan A. Boyles, Raleigh, NC (US);
Stephen M. Diering, Raleigh, NC (US);
Nathanael F. Ehrich, Durham, NC
(US); Joseph E. Firebaugh, Cary, NC
(US); Robert C. Leah, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 807 days.

(21) Appl. No.: 10/906,081

(22) Filed: Feb. 2, 2005

(65) Prior Publication Data

US 2006/0174200 A1 Aug. 3, 2006

(51) Int. Cl.
*G06F 17/00* (2006.01)
(52) U.S. Cl. ........................... 715/734; 715/788
(58) Field of Classification Search .................. 706/46; 715/734–737, 788
See application file for complete search history.

(56) References Cited

U.S. PATENT DOCUMENTS

| | | | | |
|---|---|---|---|---|
| 5,838,317 | A | * 11/1998 | Bolnick et al. | ............... 715/764 |
| 5,910,803 | A | 6/1999 | Grau et al. | |
| 6,151,031 | A | 11/2000 | Atkins et al. | |
| 6,477,572 | B1 | 11/2002 | Elderton et al. | |
| 6,594,696 | B1 | 7/2003 | Walker et al. | |
| 6,763,342 | B1 * | 7/2004 | Mattern et al. | ................. 706/46 |
| 7,346,858 | B1 * | 3/2008 | Berg et al. | ................... 715/853 |
| 2002/0109704 | A1 * | 8/2002 | Rajarajan et al. | ............. 345/619 |

\* cited by examiner

*Primary Examiner*—Ba Huynh
*Assistant Examiner*—Enrique W Iturralde
(74) *Attorney, Agent, or Firm*—Charles L. Moore; Frederick D. Bailey; Moore & Van Allen, PLLC (57) ABSTRACT

A method to correlate and consolidate a plurality of events may include consolidating each of the plurality of events to form a multi-personality event. Each event may be emitted from a respective one of a plurality of components forming an event producer in response to an incident affecting the event producer. The method may also include providing the multi-personality event to an event consumer.

3 Claims, 7 Drawing Sheets

FIG. 1A

CLIENT
102

```
┌─ 106
│ DISPLAY IMAGE, LAYOUT OF
│ TOPOLOGY OBJECTS, ETC.
└─

┌─ 108
│ DETECT A CLICK EVENT OR THE LIKE
│ USING POINTING DEVICE, MOUSE, ETC.
│ (DISPLAY CONTEXT MENU IF PRESET OR
│ RIGHT CLOCK, CARRY OUT FUNCTION
│ SELECTED IN MENU, ETC.)
└─

┌─ 110
│ DETERMINE RELATIVE POSITION OF CLICK
│ EVENT IN IMAGE (EX. LOCATION OF CLICK
│ EVENT BY RELATIVE PROPORTIONAL
│ MEANS, PERCENTAGE OF DISTANCE
│ FROM EDGES OF IMAGE, ETC.)
└─

┌─ 112
│ GENERATE URL INCLUDING LOCATION
│ PARAMETERS CORRESPONDING TO THE
│ POSITION OF THE CLICK EVENT, TYPE OF
│ CLICK EVENT AND ANY OTHER DATA TO
│ CARRY OUT OPTIONS SELECTED IN
│ CONTEXT MENU, ETC.
└─

┌─ 114
│ SUBMIT URL TO SERVER OR
│ THE LIKE
└─
```

METHOD AND SYSTEM TO LAYOUT TOPOLOGY OBJECTS

BACKGROUND OF INVENTION

The present invention relates to computer systems and software and more particularly to a method and system to layout topology objects, particularly in a primitive environment.

Typically, robust personal computer (PC) applications and the like that are capable of displaying topological layouts, network graphs or similar representations may offer as a core function the ability to "click-on" and "drag" or move topological objects as a means to reposition objects and layout the network graph or representation. Such robust PC applications may also provide the functionality to bend links or "lasso" and drag multiple objects to re-layout large areas of topology. However, in other less robust or primitive applications or device types, such as Web/Markup Applications or the like, the ability to perform complex interactions, such as dragging, selecting, repositioning and similar operations, may not be available. An additional challenge is that these primitive environments may run in a stateless environment. In a stateless environment, the graphical display is independent of the topology data model. Within a markup language, a topology map is simply a singular image and is not made up of multiple different objects (links, nodes, etc.) that can be easily recognized, selected or manipulated by the client. Because the topology object itself cannot be directly distinguished by the computer pointing device in such primitive or stateless environments, the ability to directly influence, select, manipulate or perform other operations is not possible.

BRIEF SUMMARY OF INVENTION

In accordance with an embodiment of the present invention, a method to layout topology objects may include determining a relative position of a click event in an image on a client computer. The method may also include generating a Universal Resource Locator (URL), wherein the URL includes location parameters corresponding to the relative position of the click event in the image. The method may further include submitting the URL to a server.

In accordance with another embodiment of the present invention, a system to layout topology objects may include a data structure to determine a relative position of a click event in an image on a client computer. The system may also include a data structure to generate a URL, wherein the URL includes location parameters corresponding to the relative position of the click event in the image. The system may further include a data structure to submit the URL to a server.

In accordance with another embodiment of the present invention, a computer program product to layout topology objects may include a computer readable medium having computer readable program code embodied therein. The computer readable medium may include computer readable program code configured to determine a relative position of a click event in an image on a client computer. The computer program product may also include computer readable program code configured to generate a URL, wherein the URL includes location parameters corresponding to the relative position of the click event in the image. The computer program product may further include computer readable program code configured to submit the URL to a server.

DETAILED DESCRIPTION OF THE INVENTION

The following detailed description of embodiments refers to the accompanying drawings, which illustrate specific embodiments of the invention. Other embodiments having different structures and operations do not depart from the scope of the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java7, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figures 1, 1A:
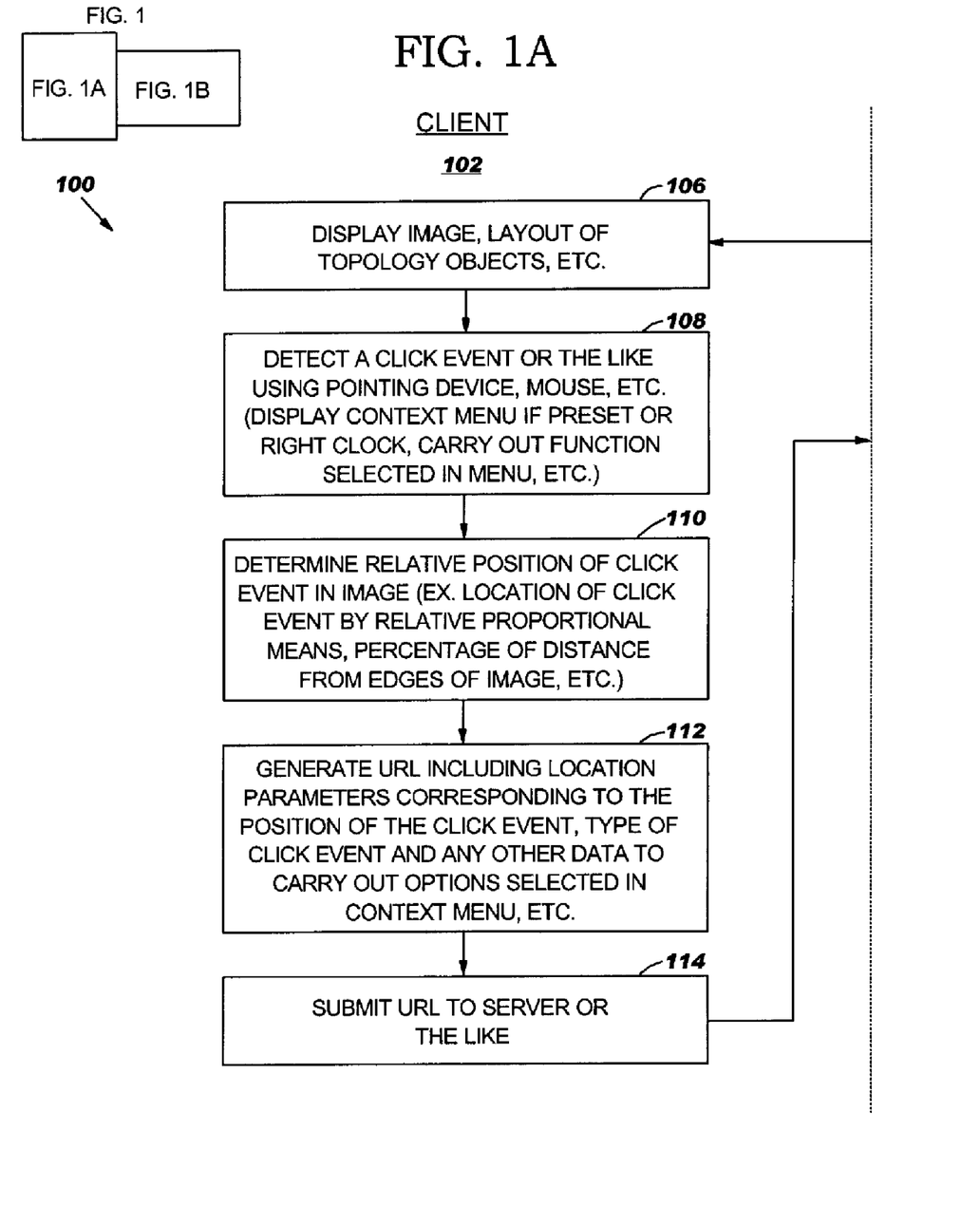
FIGS. 1A and 1B (collectively FIG. 1) are a flow chart of an example of a method to layout topology objects or the like in accordance with an embodiment of the present invention.
Figure 1B:
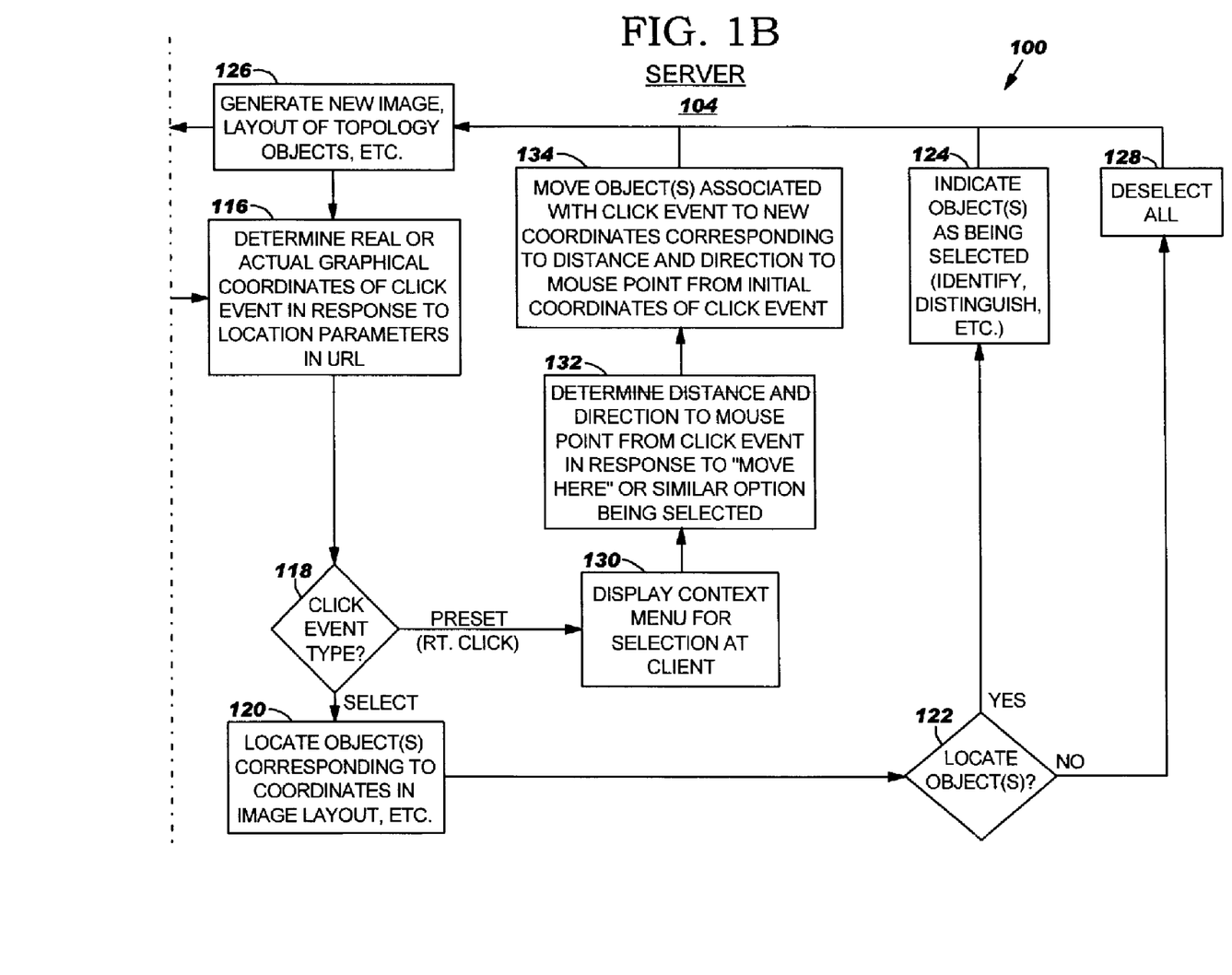

FIGS. 1A and 1B (collectively FIG. 1) are a flow chart of an example of a method 100 to layout topology objects or the like in accordance with an embodiment of the present invention. The method 100 may be divided into operations or functions that may typically be performed by a client computer system (client 102) or the like as illustrated in FIG. 1A, and operations or functions that may typically be performed by a server, web server or the like (server 104) as illustrated in FIG. 1B. However, depending on system design or configuration, some functions or operations may be performed by a component of a system other than as illustrated herein. The invention is not intended to be limited in any way by the specific component, client 102 or server 104, that may be illustrated in the example method 100 of FIGS. 1A and 1B as performing a particular function.

Figure 2A:
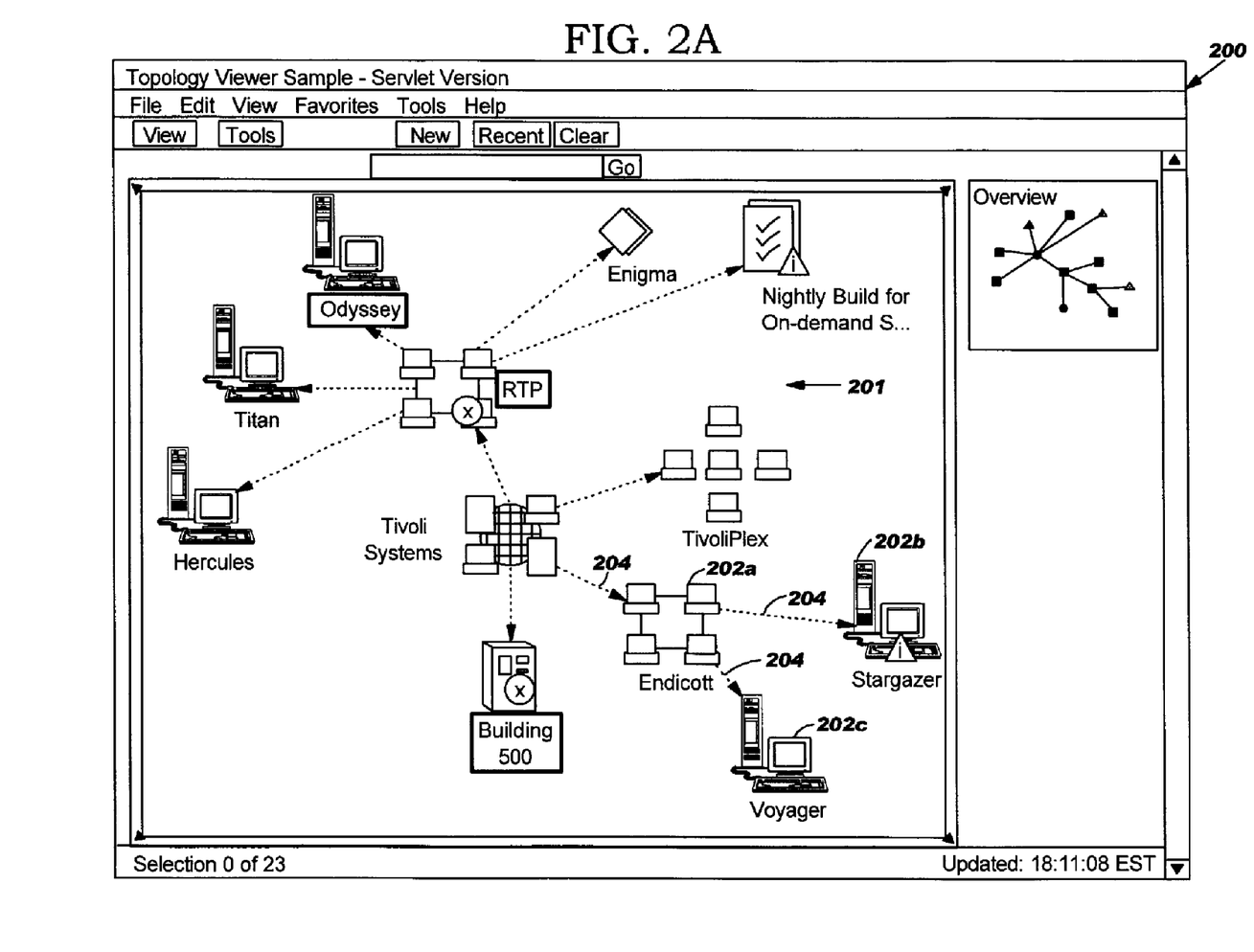
FIGS. 2A-2D are a sequence of images or computer screen shots illustrating operation of a method to layout topology objects or the like in accordance with an embodiment of the present invention.

In block 106, an image may be displayed of the topology map, layout of topology objects or the like. FIG. 2A is an example of an image 200 or computer screen shot of a topology map 201 or layout of topology objects in accordance with an embodiment of the present invention. The image 200 may be a primitive view in a primitive environment, stateless environment or the like. Accordingly, the image 200 may be any graphical display where the graphical or topology data model may be a singular image or where the image is made up of multiple objects that cannot be individually recognized by a client computer system or the like and manipulated. The image 200 may include multiple objects 202-204. Examples of objects may include nodes 202, links or connectors 204 that may interconnect the nodes 202 and labels or other textual data. The labels may be associated with and identify each node 202 and may be a separate object or form a single object 202 with the node being labeled. The node objects 202 may represent different computer systems, servers, databases or other components that may be interconnected by the communication links or connectors 204 to form the topology map 201 or layout of topology objects depicting a network or larger system.

Returning to FIG. 1A, in block 108, a click event may be detected in a client computer system 102 or the like. The click event may be any commonly known click event in the computer field, such as a user manipulating a computer pointing device, mouse or the like and operating a button, thumb wheel, joy stick or similar mechanism associated with the pointing device while the pointing device or virtual indicator displayed on a computer monitor, corresponding to the pointing device, is positioned substantially over or at least partially touching an object or objects in an image. The click event may also be a particular type of click event as is known in the computer field, such as a "left click," a "right click" or other similar operation. Typically, a "left click" or operating a left button on a computer pointing device, mouse or the like may correspond to directing a computer program or application to select the object. The computer pointing device or rather virtual indicator displayed on a computer monitor that corresponds to the pointing device may be positioned over or touching the object intended to be selected in the image. The left button on the pointing device or mouse may then be depressed or operated to select the object underlying or touched by the virtual indicator of the pointing device. A "right click" may cause the computer program or application to perform some predetermined function, such as displaying a context menu, as indicated in block 108, and as discussed in more detail below with respect to block 130 in FIG. 1B and FIG. 2C.

In block 110, a relative position where the click event occurred in the image may be determined. The relative position or location of the click event may be determined by proportional means, such as calculating a percentage of distance from a vertical side edge and a horizontal side edge of the image to where the click event occurred. The relative position of the click event may also be determined by calculating relative distances and directions from a reference point or points such as the edges of the image or the like.

In block 112, a Universal Resource Locator (URL) or the like may be generated. The URL may contain location parameters corresponding to the relative position or location of the click event determined in block 110. The URL may also include any other data or parameters associated with the click event, such as the type of click event, an option that may have been selected from a context menu displayable by a preset click event, e.g., a right mouse click, in block 108 or the like. In block 114, the URL may be submitted or transmitted to a server.

In block 116 (FIG. 1B), real or actual graphical coordinates of the location or position of the click event in the image may be determined in response to or based on the location parameters in the URL. In block 118, the click event type may be determined. If a "select" type click event occurred, e.g., a left mouse click, the method 100 may advance to block 120. In block 120, at least one object located substantially at the coordinates determined in block 116 may be located in the image or layout of topology objects. In block 122, a determination may be made whether one or more objects have been located substantially at the coordinates determined in block 116 and therefore are associated with or have been selected in response to the "select" type click event. If one or more objects are determined to be located in the image corresponding to the coordinates of the click event, the method 100 may advance to block 124. In block 124, the object or objects may be indicated as being selected. The object or objects may be indicated as being "selected" by distinguishing, highlighting or otherwise identifying the selected objects from other objects in the image.

As previously discussed, a "select" type click event may involve touching or contacting an object to be selected with a virtual indicator (typically and arrow or the like) that corresponds to the pointing device in an image on a computer monitor and operating a left mouse button. The object may then be highlighted or otherwise distinguished from other objects in the image to identify the object as being selected. Multiple objects may be highlighted or distinguished, i.e., selected by a single click event or multiple click events associated with each selected object. As an example, clicking on one object may also cause any other objects connected downstream or only in a communication path with the one selected object to also be distinguished from other objects in response to the click event.

Figure 2B:
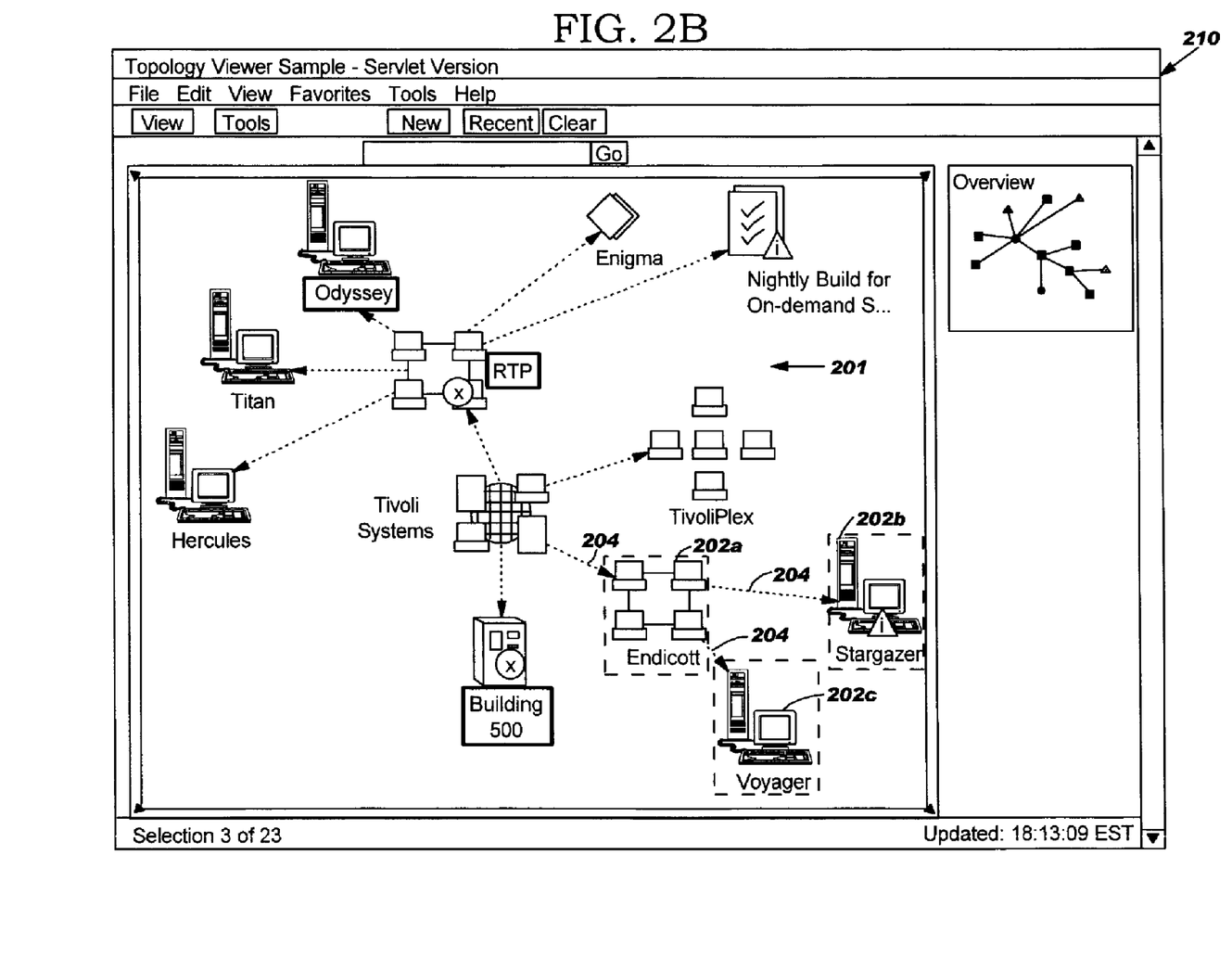

From block 124, the method 100 may advance to block 126. In block 126, a new image may be generated with the selected object or objects being distinguished or otherwise identified. The method 100 may then return to block 106 in FIG. 1A and the image may be displayed with the selected object or objects being distinguished from other objects. FIG. 2B is an example of a new image 210 illustrating objects 202a, 202b and 202c and associated labels being selected and distinguished from other objects in the image 210 or layout in response to a click event. The objects 202a, 202b and 202c may be distinguished by highlighting as represented in FIG. 2B by the broken or dashed line surrounding the objects 202a-202c or the objects 202a-202c may be distinguished by some other means appropriate to bring a user's attention to the fact that the objects 202a-202c have been selected.

Returning to block 122 in FIG. 1B, if no object or objects are located in block 122 corresponding to the coordinates, the method 100 may advance to block 128. In block 128, any objects that may have been indicated as being selected are deselected. The method may then advance to block 126 and the method 100 may proceed as previously discussed. In block 106, the image or layout of topology objects may be displayed without any objects being selected, highlighted or otherwise distinguished from other objects.

Figure 2C:
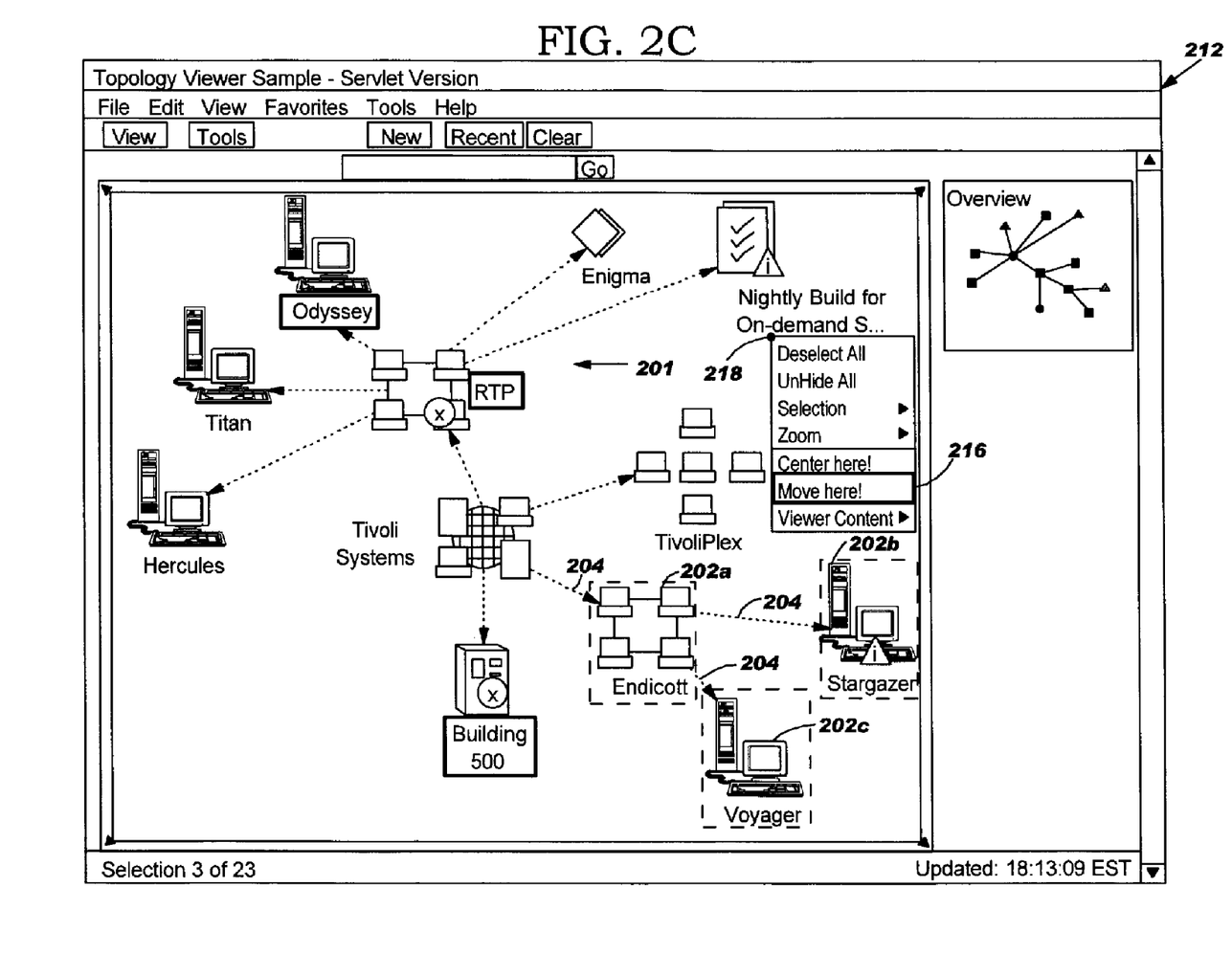

Returning to block 118, if the click event is determined to be a preset type click event, such as a right click event, the method 100 may advance to block 130. In block 130, a context menu may be displayed at the client 102 as previously discussed with respect to block 108. FIG. 2C is an image 212 or computer screen shot of the topology map 201 or layout of topology objects illustrating a context menu 214 in accordance with an embodiment of the present invention. The context menu 214 may be displayed in response to a preset type click event, such as a right click event or other preset click event. The object 202a or objects 202a-202c that were touched or contacted in association with the preset or right click event in block 108 may be selected or distinguished from other objects in image 212 to indicate that any options selected or actions taken with respect to the context menu 214 are applicable to the selected or distinguished objects 202a-202c. Distinguishing of the selected objects 202a-202c is illustrated in FIG. 2C by a dashed or broken line surrounding the objects 202a-202c which may correspond to highlighting or otherwise drawing a user's attention to the selected objects 202a-202c in the image 212.

Examples of different options that may be selected in the context menu 214 may include "Deselect All," "UnHide All," "Selection," "Center here!" "Move here!," "Viewer Content." The "Center here!" option or "Move here!" option 216 may be used to move the selected objects 202a-202c and thereby layout topology objects. A location indicator or mouse point 218 may be positioned on the image 212 using a pointing device to select the new position of the objects 202a-202c in the primitive or stateless environment.

The click event in block 108 of Figure IA may include moving the mouse point 218 to a new desired position of the objects 202a-202c. The relative position of the mouse point 218 at the new desired position may also be determined in block 110 similar to that previously described for the click event and parameters for the new desired position of the mouse point 218 may be included in the URL generated in block 112 and submitted to the server 104 in block 114 similar to that previously described.

Figure 2D:
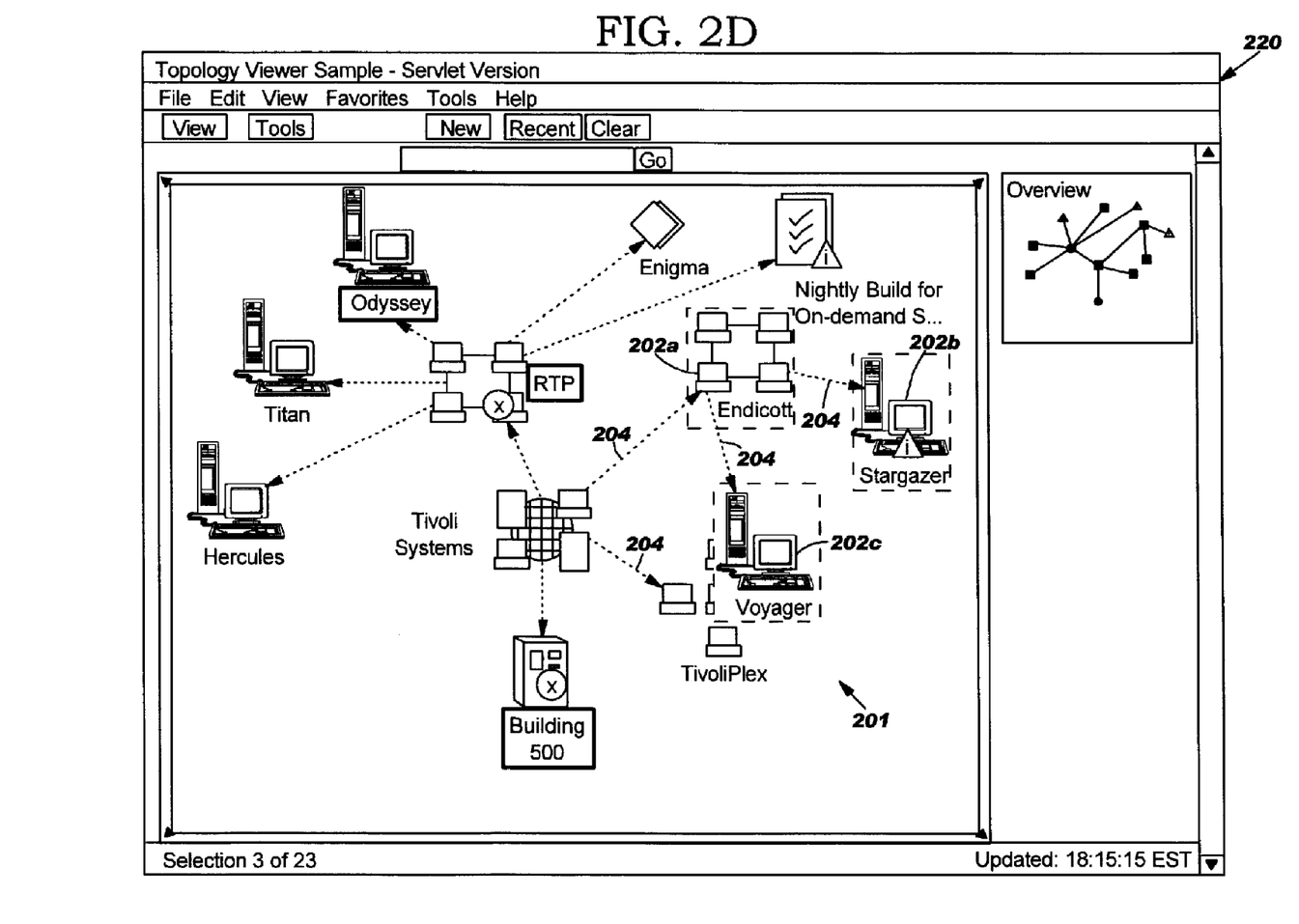

Returning to FIG. 1B, in block 132, a distance and direction may be determined to the mouse point 218 in response to the "Move here!" option 216 or a similar option being selected in the context menu 214 (FIG. 2C). The distance and direction to the mouse point 218 may be determined from the click event parameters submitted to the server 104 in block 114. In block 134, the object or objects associated with the click event or events may be moved to the new coordinates corresponding to the distance and direction to the mouse point 218 from the original coordinates of the click event or events determined in block 116. From block 134, the method 100 may advance to block 126. In block 126, a new image, layout of topology objects or the like may be generated and transmitted to the client 102. In block 106 (FIG. 1A), the new image, layout or the like may be displayed or presented to the user. FIG. 2D is an image 220 or computer screen shot of a topology map 201 or layout of topology objects illustrating moving selected topology objects 202a-202c associated with a click event to new coordinates defined by the mouse point 218 in FIG. 2C in accordance with an embodiment of the present invention. The moved objects 202a-202c may still be distinguished from other objects in the layout 201 to indicate they remain selected until the user accepts the new location of the objects 202a-202c. Accordingly, the user may further move the objects 202a-202c or select another option by performing another preset click event, for example a right click event, to present the context menu 214 as illustrated in FIG. 2C. Alternatively, the user may perform a click event in any space in the image 220 not occupied by an object and the method 100 may advance to block 128 similar to that previously described. In block 128 the objects 202a-202c may be deselected to accept the new location of the moved objects 202a-202c.

Figure 3:
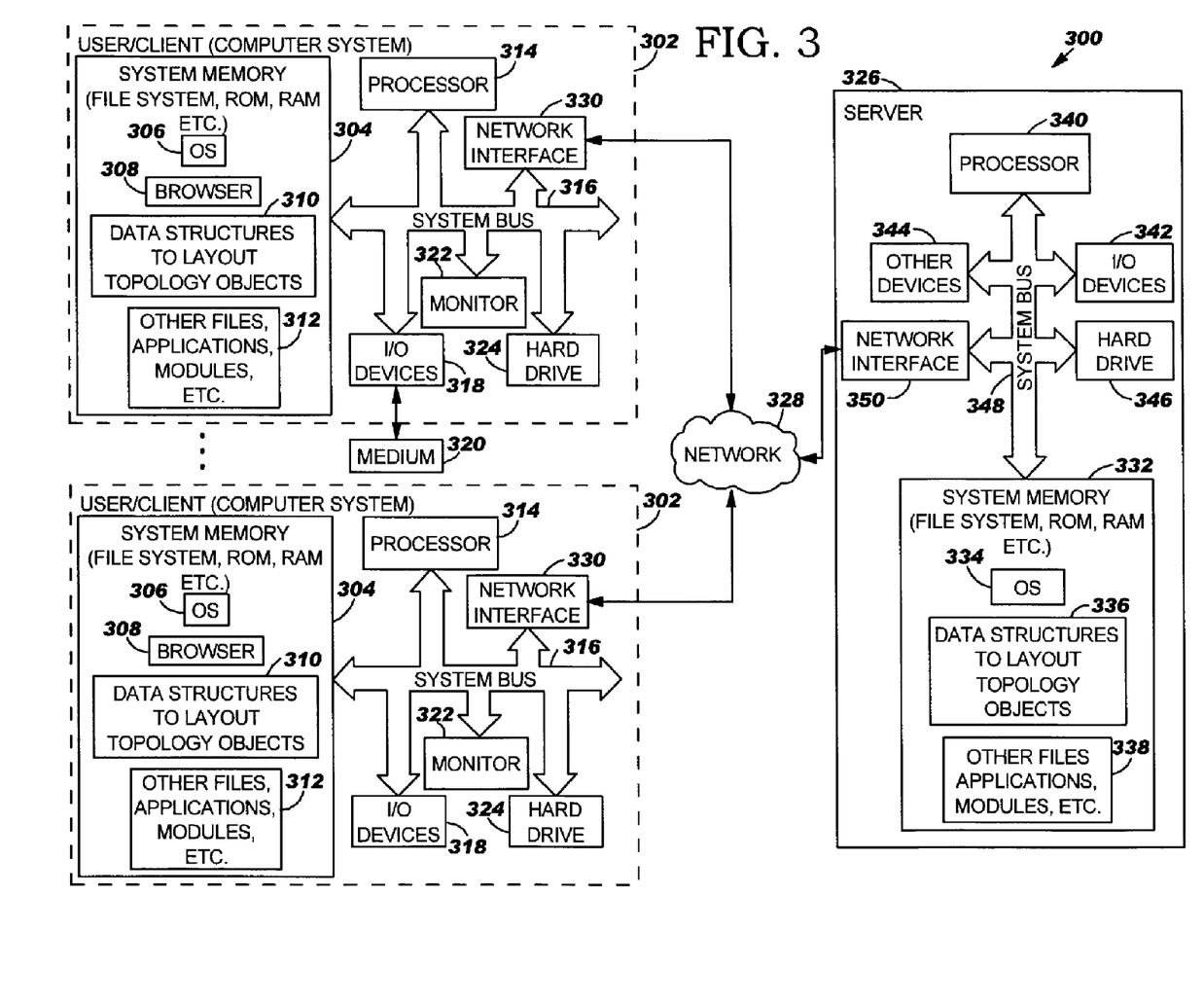
FIG. 3 is an exemplary system to layout topology objects in accordance with an embodiment of the present invention.

FIG. 3 is an exemplary system 300 to layout topology objects in accordance with an embodiment of the present invention. The method 100 of FIGS. 1A and 1B may be embodied in and performed by the system 300. The system 300 and method 100 may generate and present the images or screen shot examples illustrated in FIGS. 2A-2D to a user. The system 300 may include one or more user or client computer systems 302 or similar systems or devices.

The client computer system 302 may include a system memory or local file system 304. The system memory 304 may include a read only memory (ROM) and a random access memory (RAM). The ROM may include a basic input/output system (BIOS). The BIOS may contain basic routines that help to transfer information between elements or components of the computer system 302. The RAM or system memory 304 may contain an operating system 306 to control overall operation of the computer system 302. The RAM may also include a browser 308 or web browser. The RAM may also include data structures 310 or computer-executable code to layout topology objects or the like that may be similar or include elements of the method 100 of FIGS. 1A and 1B. The RAM may further include other application programs 312, other program modules, data, files and the like for other purposes or functions.

The computer system 302 may also include a processor or processing unit 314 to control operations of the other components of the computer system 302. The operating system 306, browser 308, data structures 310 and other program modules 312 may be operable on the processor 314. The processor 314 may be coupled to the memory system 304 and other components of the computer system 1102 by a system bus 316.

The computer system 302 may also include multiple input devices, output devices or combination input/output devices 318. Each input/output device 318 may be coupled to the system bus 316 by an input/output interface (not shown in FIG. 3). The input and output devices or combination I/O devices 318 permit a user to operate and interface with the computer system 302 and to control operation of the browser 308 and data structures 310 to access, operate and control the automated risk management system. The I/O devices 318 may include a keyboard and computer pointing device or the like to perform the operations discussed herein, such as the click events.

The I/O devices 318 may also include disk drives, optical, mechanical, magnetic, or infrared input/output devices, modems or the like. The I/O devices 318 may be used to access a medium 320. The medium 320 may contain, store, communicate or transport computer-readable or computer-executable instructions or other information for use by or in connection with a system, such as the computer systems 302.

The computer system 302 may also include or be connected other devices, such as a display or monitor 322. The monitor 322 may be used to permit the user to interface with the computer system 302. The monitor 322 may present the images 200, 210, 212 and 220, web pages or screen shots represented in FIGS. 2A-2D to a user or requester that may be generated by the data structures 310 to layout topology objects.

The computer system 302 may also include a hard disk drive 324. The hard drive 324 may be coupled to the system bus 316 by a hard drive interface (not shown in FIG. 3). The hard drive 324 may also form part of the local file system or system memory 304. Programs, software and data may be transferred and exchanged between the system memory 304 and the hard drive 324 for operation of the computer system 302.

The computer systems 302 may communicate with a remote server 326 and may access other servers or other computer systems (not shown) similar to computer system 302 via a network 328. The system bus 316 may be coupled to the network 328 by a network interface 330. The network interface 330 may be a modem, Ethernet card, router, gateway or the like for coupling to the network 328. The coupling may be a wired connection or wireless. The network 328 may be the Internet, private network, an intranet or the like.

The server 326 may also include a system memory 332 that include a file system, ROM, RAM and the like. The system memory 332 may include an operating system 334 similar to operating system 306 in computer systems 302. The system memory 332 may also include data structures 336 to layout topology objects or the like. The data structures 336 may include operations similar to those described with respect to method 100 in FIG. 1B. The server system memory 332 may also include other files 338, applications, modules and the like for other purposes or to perform other operations.

The server 326 may also include a processor 340 or a processing unit to control operation of other devices in the server 326. The server 326 may also include I/O device 342. The I/O devices 342 may be similar to I/O devices 318 of computer systems 302. The server 326 may further include other devices 344, such as a monitor or the like to provide an interface along with the I/O devices 342 to the server 326. The server 326 may also include a hard disk drive 346. A system bus 348 may connect the different components of the server 326. A network interface 350 may couple the server 326 to the network 328 via the system bus 348.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method to layout topology objects in a stateless environment, comprising:
   determining a relative position of a click event in an image on a client computer running in a stateless environment, the image being a single image and not made up of multiple different objects that may be recognized, selected or manipulated;

generating a URL, wherein the URL includes location parameters corresponding to the relative position of the click event in the image;
submitting the URL to a server;
determining actual graphical coordinates of the click event in the image in response to the location parameters in the URL;
locating at least one object in the image corresponding to the actual graphical coordinates in response to the click event;
distinguishing the at least one object from any other objects in the image in response to the click event being a select type click event;
generating a new image with the at least one object being distinguished;
displaying a context menu in response to the click event being a preset type click event;
determining a distance and direction to a mouse point from the actual graphical coordinates of the click event in response to a move option being selected in the context menu;
moving any objects associated with the click event to new coordinates corresponding to the distance and direction to the mouse point from the actual coordinates of the click event; and
generating a new image with any moved objects in a new location corresponding to the new coordinates.

2. A system to layout topology objects in a stateless environment, comprising:
a network;
a server, the server being operatively connected to the network; and
at least one client computer system running in a stateless environment, each at least one client computer system being operatively connected to the network and having a memory device, the memory device comprising:
 a data structure to determine a relative position of a click event in an image on a client computer, the image being a single image and not made up of multiple different objects that may be recognized, selected or manipulated;
 a data structure to generate a URL, wherein the URL includes location parameters corresponding to the relative position of the click event in the image;
 a data structure to submit the URL to a server;
 a data structure to determine actual graphical coordinates of the click event in the image in response to the location parameters in the URL;
 a data structure to display a context menu in response to the click event being a preset type click event;
 a data structure to determine a distance and direction to a mouse point from the actual graphical coordinates of the click event in response to a move option being selected in the context menu;
 a data structure to move any objects associated with the click event to new coordinates corresponding to the distance and direction to the mouse point from the actual coordinates of the click event;
 a data structure to generate a new image with any moved objects in a new location corresponding to the new coordinates;
 a data structure to locate at least one object in the image corresponding to the actual graphical coordinates in response to the click event;
 a data structure to distinguish the at least one object from any other objects in the image in response to the click event being a select type click event; and
 a data structure to generate a new image with the at least one object being distinguished.

3. A computer program product to layout topology objects, the computer program product comprising a computer readable storage medium having computer readable program code embodied therein, the computer readable storage medium comprising:
 computer readable program code configured to determine a relative position of a click event in an image on a client computer, the image being a single image and not made up of multiple different objects that may be recognized, selected or manipulated;
 computer readable program code configured to generate a URL, wherein the URL includes location parameters corresponding to the relative position of the click event in the image;
 computer readable program code configured to submit the URL to a server;
 computer readable program code configured to determine actual graphical coordinates of the click event in the image in response to the location parameters in the URL;
 computer readable program code configured to display a context menu in response to the click event being a preset type click event;
 computer readable program code configured to determine a distance and direction to a mouse point from the actual graphical coordinates of the click event in response to a move option being selected in the context menu;
 computer readable program code configured to move any objects associated with the click event to new coordinates corresponding to the distance and direction to the mouse point from the actual coordinates of the click event;
 computer readable program code configured to generate a new image with any moved objects in a new location corresponding to the new coordinates;
 computer readable program code configured to locate at least one object in the image corresponding to the actual graphical coordinates in response to the click event;
 computer readable program code configured to distinguish the at least one object from any other objects in the image in response to the click event being a select type click event; and
 computer readable program code configured to generate a new image, wherein the at least one object is distinguished from any other objects in the new image.

* * * * *